United States Patent [19]

Larson et al.

[11] Patent Number: 5,564,316
[45] Date of Patent: Oct. 15, 1996

[54] NUBBED GRIP FOR ROTATABLE BICYCLE GEAR SHIFTER

[75] Inventors: Michael W. Larson, Chicago; Andrew J. Caron, Berwyn; John D. Cheever, Chicago; Tymme A. Laun, Chicago; Tyler D. Duston, Chicago, all of Ill.

[73] Assignee: SRAM Corporation, Chicago, Ill.

[21] Appl. No.: 330,285

[22] Filed: Oct. 27, 1994

Related U.S. Application Data

[63] Continuation-in-part of Ser. No. 287,721, Aug. 9, 1994, and Ser. No. 207,249, Mar. 7, 1994, Pat. No. 5,476,019.

[51] Int. Cl.$^6$ ............................. B62K 23/04; B62K 21/26
[52] U.S. Cl. ............................................. 74/551.9; 74/489
[58] Field of Search ............................. 74/551.9, 551.1, 74/551.8, 558, 488, 489

[56] References Cited

U.S. PATENT DOCUMENTS

| | | | |
|---|---|---|---|
| 1,231,055 | 6/1917 | Packard . | |
| 3,020,778 | 2/1962 | Davidson | 74/489 |
| 3,522,745 | 8/1970 | Milosevic | 74/489 |
| 3,713,350 | 1/1973 | Brilando | 74/551.9 |
| 4,191,065 | 3/1980 | Golobay et al. | 74/489 |
| 4,201,095 | 5/1980 | Cirami | 74/217 |
| 4,267,744 | 5/1981 | Yamasaki | 74/475 |
| 4,308,762 | 1/1982 | Jannard | 74/551.9 |
| 4,384,864 | 5/1983 | Bonnard | 474/82 |
| 4,526,056 | 7/1985 | Yamanaka | 74/489 |
| 4,548,092 | 10/1985 | Strong, Jr. | 74/475 |
| 4,619,154 | 10/1986 | Yamanaka | 74/489 |
| 4,895,044 | 1/1990 | Ekins | 74/551.9 |
| 4,900,291 | 2/1990 | Patterson | 474/80 |
| 4,938,733 | 7/1990 | Patterson | 474/80 |
| 4,946,425 | 8/1990 | Bühlmann | 474/80 |
| 5,059,158 | 10/1991 | Bellio et al. | 474/70 |
| 5,097,566 | 3/1992 | Decker et al. | 74/551.9 X |
| 5,102,372 | 4/1992 | Patterson et al. | 474/80 |
| 5,134,897 | 8/1992 | Romano | 74/489 |
| 5,186,071 | 2/1993 | Iwasaki | 74/489 |
| 5,197,927 | 3/1993 | Patterson et al. | 474/80 |
| 5,241,877 | 9/1993 | Chen | 74/489 |
| 5,261,858 | 11/1993 | Browning | 474/69 |

FOREIGN PATENT DOCUMENTS

| | | |
|---|---|---|
| 2082665 | 11/1992 | Canada . |
| 0294720 | 6/1988 | European Pat. Off. . |
| 0523257 | 2/1992 | European Pat. Off. . |
| 0529664 | 8/1992 | European Pat. Off. . |
| 0566025 | 4/1993 | European Pat. Off. . |
| 0566024 | 4/1993 | European Pat. Off. . |
| 0585473 | 9/1993 | European Pat. Off. . |
| 485145 | of 0000 | France ............... 74/551.9 |
| 7246272 | 7/1974 | France . |
| 688541 | 10/1938 | Germany . |
| 9317875 | 3/1994 | Germany . |
| 5-32191 | 9/1993 | Japan . |
| 667244 | 8/1985 | Switzerland . |
| 9278 | of 1893 | United Kingdom ............... 74/551.9 |
| 19602 | of 1893 | United Kingdom ............... 74/551.9 |
| 122270 | 2/1919 | United Kingdom . |
| 2024381 | 1/1980 | United Kingdom . |
| 9219488 | 11/1992 | WIPO . |
| 9402348 | 2/1994 | WIPO . |

OTHER PUBLICATIONS

SRAM Corporation Drawings, Apr. 22, 1992—Representation of handgrip designs that were available to the public more than one year prior to the filing of this application.

*Primary Examiner*—Charles A. Marmor
*Assistant Examiner*—Mary Ann Battista
*Attorney, Agent, or Firm*—Jefferson Perkins

[57] ABSTRACT

Nubbed grips for hand-rotatable bicycle gear shifters have longitudinally elongated groups of nubs (50, 96, 142) that are angularly spaced apart by valley regions (44, 98, 156). Preferably, the elastomeric nubs are formed both on a cylindrical portion and an adjacent flanged portion of the grip. In an alternative embodiment, shark tooth nubs (142) offer leading faces (158) against which a hand of a rider may abut in either rotational direction for maximum torque transmission.

17 Claims, 6 Drawing Sheets

NUBBED GRIP FOR ROTATABLE BICYCLE GEAR SHIFTER

RELATED APPLICATION

This application is a continuation-in-part of application Ser. No. 08/287,721 filed Aug. 9, 1994 (Attorney's Docket No. 16100-038), and a continuation-in-part of application Ser. No. 08/207,249 filed Mar. 7, 1994 now U.S. Pat. No. 5,476,019, (Attorney's Docket No. 16100-026). Both of these applications are fully incorporated by reference herein.

TECHNICAL FIELD OF THE INVENTION

The present invention relates in general to gear shifters, and more particularly to a handlebar-mounted rotatable gear shifter designed to ergonomically fit the joints and lands of a rider's hand.

BACKGROUND OF THE INVENTION

Hand-rotatable bicycle gear shifters have been developed as replacements for the older lever-actuated shifters, especially for use in conjunction with off-road or "mountain" bicycles. Hand-rotatable shift actuators are disclosed, for example, in U.S. Pat. No. 4,900,291 issued Feb. 13, 1990; U.S. Pat. No. 4,938,733 issued Jul. 3, 1990; U.S. Pat. No. 5,102,372 issued Apr. 7, 1992; and U.S. Pat. No. 5,197,927 issued Mar. 30, 1993. All of these patents are assigned to the assignee of this application. In each of the foregoing patents, a bicycle derailleur is actuated by a rotatable grip which is located on the handlebar of the bicycle inboard of the normal handgrip. Prior to this invention, the gripping surface of rotatable grips sold by the assignee of this application were typically formed of foam rubber or neoprene, were secured to an underlying rotatable member of the gear shifter assembly, and typically had a smooth outer surface.

The assignee has experimented with hand-rotatable grips with axially extending ribs where the grips were formed of a hard plastic material such as ABS; these grips were less than optimal in that they presented harsh sharp edges to the operator's hand. These edges were uncomfortable to the rider especially in those conditions involving: uneven surfaces, as occasionally experienced on most roads but presenting an especially acute problem for off-the-road bicycle travel. Also, these prior rotatable grips of the assignee tended to become slippery when fouled by mud and the like, reducing the amount of torque capable of being applied by the rider. A need therefore exists for improved grips with optimum torque-transmission and antifouling features which are adapted to be incorporated into a hand-rotatable gear shifter.

SUMMARY OF THE INVENTION

According to one aspect of the present invention, a grip for a hand-rotatable bicycle gear shifter is provided which includes a body having a generally cylindrical surface. A plurality of upstanding elastomeric nubs or features extends radially outwardly from the cylindrical surface to be spaced apart from each other in each of two directions that are tangential to the generally cylindrical surface. Each of these upstanding features has a sidewall which is formed at a substantial angle to the generally cylindrical surface. The upstanding features permit mud and other fouling matter to drop between them, thereby presenting a relatively clean and comfortable gripping surface to the rider. Further, when tangential pressure is applied by the hand to a sidewall of any upstanding feature, the sidewall is stretched in a radial outward direction, thereby allowing more torque to be applied by the hand to the upstanding feature.

According to another aspect of the invention, the upstanding features are themselves formed on a plurality of upstanding longitudinal ribs. Each of the ribs has an end surface at a second radius which is substantially greater than the general radius of the cylindrical surface of the grip. It is preferred that from four to six such longitudinal ribs be formed as a portion of the grip, and more preferably, five such ribs, as spaced equidistantly around the periphery of the grip.

The inventors have observed that as wrapped around a cylindrical shape, the hand naturally has several crooks and lands. According to a further aspect of the invention, therefore, the rotatable gear shifter disposes its groups of nubs and/or ribs such that a first of the ribs or nub groups is disposed adjacent the joint between the distal phalanx and the middle phalanx of the forefinger of a hand of the rider when gripping the grip, a second of the ribs or nub groups is disposed adjacent the joint between the middle phalanx and the proximal phalanx of the forefinger of that hand, and a third of the ribs or nub groups is disposed adjacent the joint between the proximal phalanx and the metacarpal phalanx of the forefinger. Preferably, a fourth of the ribs or nub groups is disposed adjacent the joint between the proximal phalanx and the metacarpal of the thumb of the rider's hand.

According to a further aspect of the invention, the body of the grip includes first and second portions, with the first portion being formed substantially as a cylinder and the second portion having a radius at one of its ends which is substantially greater than the radius of the first portion. Nubs are formed on the second or flange portion as well as the cylindrical portion in order to increase frictional force and therefore the torque capable of being applied by the rider. This second or flange portion may for example take a frustoconical shape.

In an alternative embodiment, the nubs have a ramped shape, preferably a "shark tooth" shape, and are arranged in longitudinal, spaced apart rows such that some of the nubs will have leading faces which face against one direction of rotation, while the rest of the nubs have leading faces which face against the other direction of rotation. These ramped features permit an efficient transmission of torque to the grip and to the rotatable member on which the .grip is fitted, regardless of the direction in which the rider applies torque.

The present invention provides technical advantages in that it offers a comfortable grip for the rider's hand which nonetheless maximizes the amount of torque which may be transmitted from the rider to the gear shifter even in muddy or other adverse conditions.

BRIEF DESCRIPTION OF THE DRAWINGS

Other aspects of the invention and their advantages will be discerned from the following detailed description, in which like characters denote like parts, and in which.

DETAILED DESCRIPTION OF THE INVENTION

Figures 1, 2:
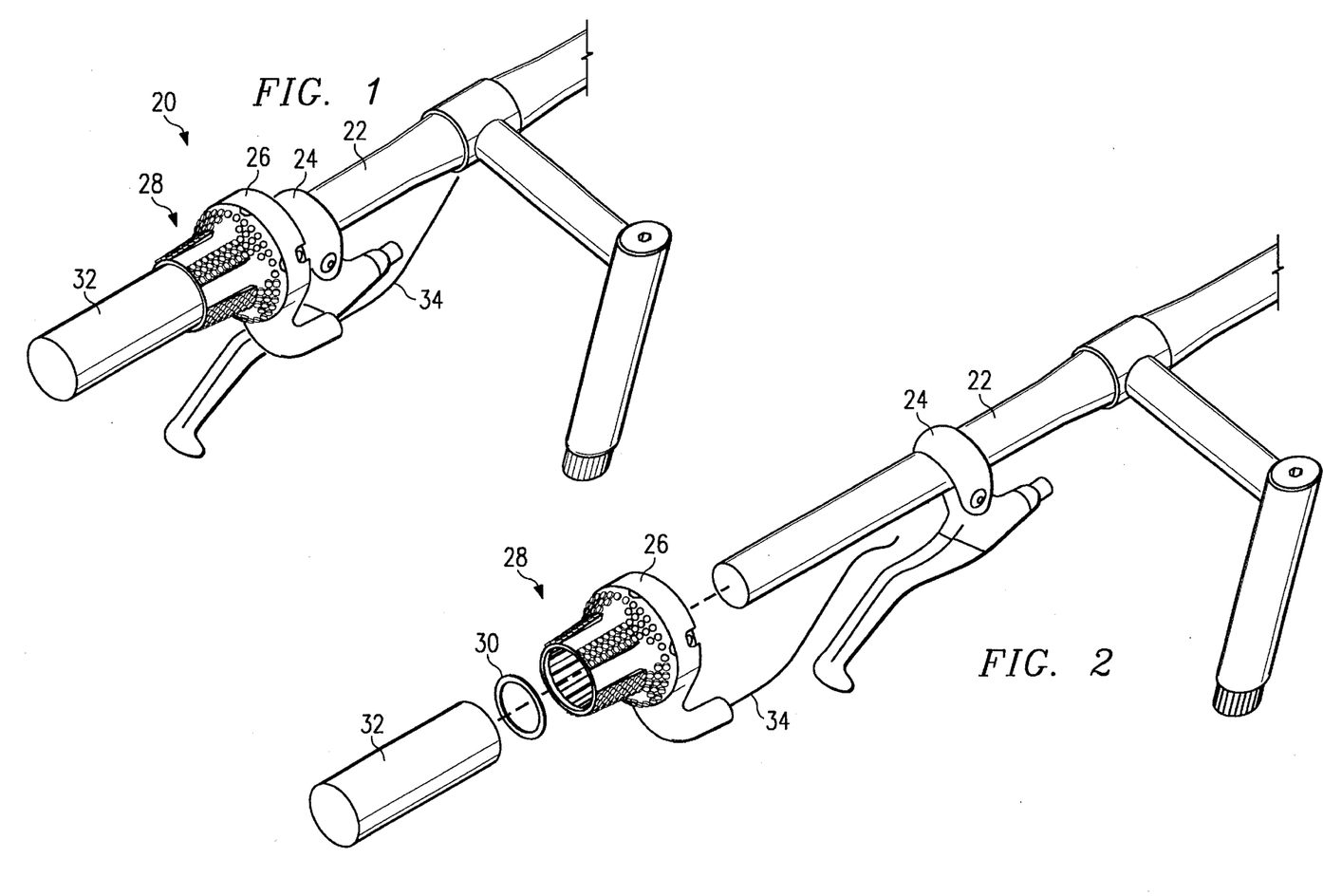
FIG. 1 is an isometric view of a portion of a bicycle handlebar on which is mounted a hand-rotatable gear shifter as incorporating a first embodiment of a grip according to the invention.
FIG. 2 is an exploded view of the hand-rotatable gear shifter and associated handlebar grip shown in FIG. 1.

Referring first to FIGS. 1 and 2, a hand-rotatable gear shifter assembly is indicated generally at 20 as mounted on a handlebar 22 of a bicycle. As previously noted, the invention is especially suited for the shifting of derailleurs on off-the-road or "mountain" bikes, although it may be advantageously applied to any bicycle or other wheeled vehicle requiring the hand actuation of a cable-linked transmission between at least two gears. In order of assembly, in the illustrated embodiment a hand-applied caliper brake lever 24 is clamped to the handlebar 22 followed by the gear shifter assembly 20, which is assembled as a unit prior to its installation on the handlebar 22. A housing 26 of the assembly 20 is fixed in place with respect to the handlebar 22, while a grip indicated generally at 28 rotates about the handlebar axis. The grip 28 is carried by a cylindrical rotating member (not shown) which rotates on a corresponding coaxial mandrel (not shown) that is fixed with respect to handlebar 22. To complete the installation, a slip ring 30 is slipped over the handlebar 22, followed by an outboard nonrotatable handgrip 32.

The gear shifter assembly 20 is one terminus of a Bowden gear shifting cable. Conventionally, the Bowden cable includes a sheath or tube (not shown) in which a strong, flexible cable 34 is axially displaced toward or away from assembly 20 by rotating the grip 28. A front or rear derailleur (not shown) typically is the other terminus of the Bowden cable 34. The axial displacement of the cable 34 up or down its length will cause the derailleur to shift gears between adjacent sprockets or chainrings associated with the derailleur. For the purpose of appreciating the invention, it is also important to note that cable 34 is under a continuous tension that in a typical embodiment is provided by a tensioning spring of the derailleur (not shown).

In a hand-rotatable gear shifter 20 of the kind which advantageously incorporates the invention, the rotation of the grip 28 causes the cable 34 to be pulled up or let out around a spool or cam which is disposed in the housing 26. This may be accomplished in any of several ways which are peripheral to the invention described herein; examples may be found in commonly assigned U.S. Pat. Nos. 5,197,927 and 5,102,372, which are fully incorporated by reference herein.

The grip of the invention has application to any hand-rotatable gear shifter. Such gear shifters typically are indexed to a plurality of predetermined positions by spring-loaded detents that are tactilely experienced by the rider in order to shift from one gear to the next, the rider rotates the grip from one detent to the next. To hold the cable against the tensioning force of the derailleur spring, the shifter is designed to require a certain minimum but substantial amount of torque to escape a particular detent in the cable releasing direction and be rotated to the next detent. Escaping a detent in the cable—pulling direction is made easier by design, to compensate for the fact that the rider is rotating against the force of the derailleur spring; the overall resistance is roughly comparable.

The invention could also have application to a friction-type gear shifter in which there are no preselected detents. A considerable amount of torque would have to be applied to the grip 28 in order to properly actuate such a shifter in the cable pulling direction. The gear shifter internal rotational friction would have to be at least equal to the amount of force exerted by the derailleur tensioning spring, and the torque necessary to rotate the shifter in a cable-pulling direction would have to exceed this.

Either the friction or the detent type of shifter requires the shifter to exhibit a predetermined amount of resistance to torque before it begins turning in a cable-releasing direction. Absent such a minimum predetermined amount of torque, the bicycle would not stay in the desired gear.

Under either scheme, therefore, the amount of frictional force which a rider's hand can apply to the grip 28, and the amount of torque which can be developed on the grip 28 with respect to the mandrel (not shown) on which grip 28 is mounted, should be maximized.

Figure 3:
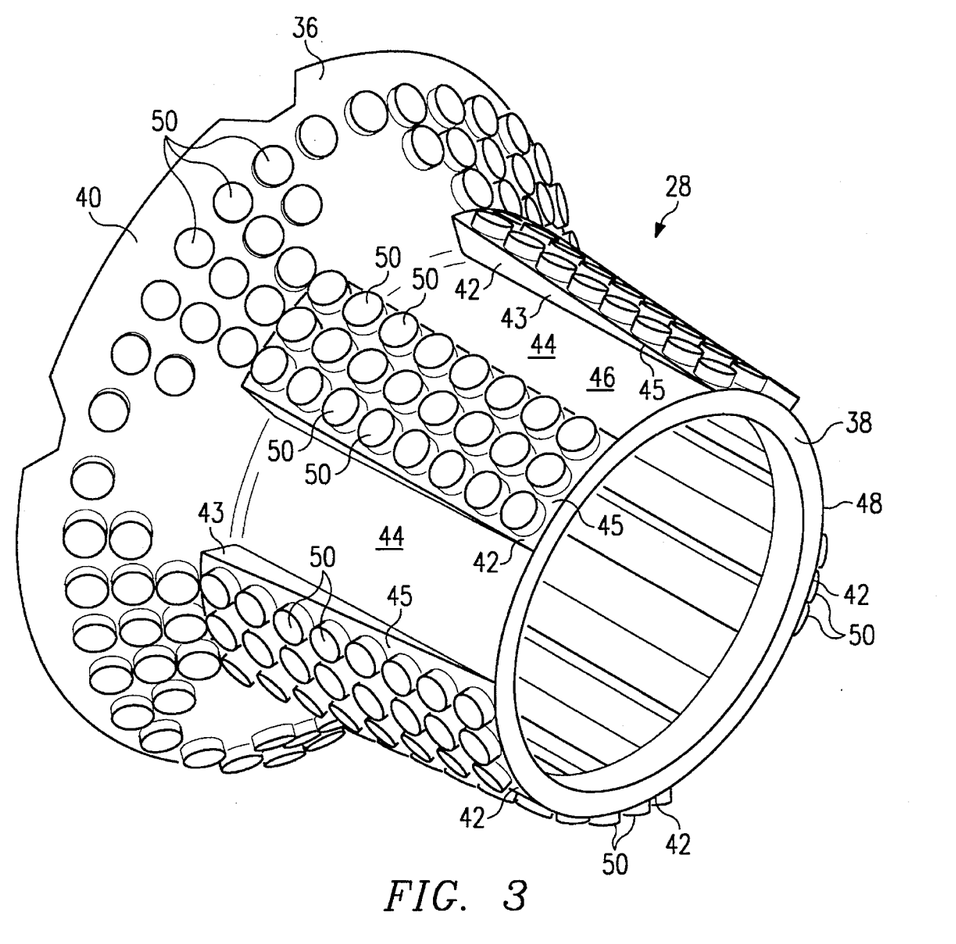
FIG. 3 is a detailed isometric-view of the first embodiment of the grip.

FIG. 3 is a detailed isometric view of a first embodiment of the grip 28 according to the invention. It is preferred that an exterior surface 36 of the grip 28 be formed of an elastomeric material for comfort to the rider's hand and for certain torque optimizing characteristics. One particularly preferred material is KRATON®, a thermoplastic elastomer manufactured by Shell. The grip 28 is designed to be stretch-fitted over a rigid cylindrical member (not shown) which in turn rotates with respect to the mandrel (not shown) that is fixed in place with respect to the bicycle handlebar 22.

Each of the embodiments illustrated herein is radially symmetrical about its longitudinal axis.

In the embodiment illustrated in FIG. 3, the grip 28 has two portions: a substantially cylindrical (and preferably slightly tapered) portion 38 and a second portion or flange 40 which is integrally formed with the first portion 38. The cylindrical portion 38 has formed thereon a plurality of longitudinally extending ribs 42 that are angularly spaced apart from one another by a like plurality of valley regions 44. The valley regions 44 extend throughout the length of the generally cylindrical portion 38, and extend into the second flanged portion 40. It is preferred that the number of ribs 42 be between four and six inclusive and more preferably five. Each of the ribs 42 has sidewalls 43 which project radially outwardly from a general surface 46 of the cylindrical portion 38 to an end or outer surface 45 of the rib 42. As measured from the axis of rotation, the outer or end surfaces 45 of the ribs 42 may be at a radius in the range of 0.5 to 0.9 inches. The surface 46 may be slightly tapered, as shown. In the illustrated embodiment, the amount of radial outward projection of each rib 42 varies linearly as a function of the distance from an outboard end 48 of the cylindrical portion 38. It is further preferred that the angular extent of the valley regions 44 be approximately the same as the angular extent of the ribs 42 which they space apart.

Each of the ribs 42 has formed on its outer or end surface 45 thereof a population or array of upstanding features or nubs 50. The ribs 42 act to radially elevate the nubs 50, such that the torque transmitted to the grip 28 is a function of the sum of the radius of the outer surface 45 of the ribs 42 plus the height of the nubs.

The ribs 42 and the upstanding features 50 are formed of an elastomeric material, and conveniently are integrally formed from the same elastomeric material forming the rest of the grip 28. The features 50 are preferably formed in a two-dimensional matrix, with both dimensions being tangential to the generally cylindrical surface 46. The width and the spacing of the features 50 are chosen such that the distance between each of the features 50 is less than or equal to the width of any one feature 50. This maximizes the number of traction or abutting edges that are available to the hand for torque transmission, with each feature 50 presenting at least one upstanding traction edge to the hand. In the embodiment illustrated in FIGS. 1–5, the features 50 take the form of relatively squat cylinders having a height which is less than or equal to their width. Other upstanding features could also be employed, as will for example be described in conjunction with FIGS. 12–16. The nubs 50 may, for example, have a diameter in the range of 0.05 to 0.2 inches inclusive.

As using the squat cylindrical nubs illustrated in FIG. 3, for example, the operating surface for grip 28 is preferred to have the following dimensions (given in inches):

| | |
|---|---|
| Rib length: | 1.1–1.3 |
| Rib width at the top: | 0.36–0.38 |
| Rib width at the bottom: | 0.38–0.4 |
| Rib height: | 0.040–0.050 |
| Space between ribs: | 0.41–0.43 |
| Nub diameter: | 0.100 |
| Nub spacing between centers: | 0.11–0.130 |
| Nub height: | 0.040–0.050 |

As installed on a bicycle, the flange portion 40 is disposed adjacent the housing 26, as is shown in FIG. 1. The grip 28 of the invention takes advantage of the enlarged diameter of the housing 26 by providing nubs 50 on the flange 40 as well as on the cylindrical portion 38. The hubs 50 will engage additional surfaces of the thumb and forefinger of the hand of the rider and will increase the amount of frictional force experienced by the rider. Because the side surface of the hand which engages flange portion 40 has no substantial crooks or lands (described in conjunction with FIG. 4), the nubs 50 on portion 40 include at least one continuous circumferential ring of nubs. Because the radius of the outer or end surfaces 45 of the ribs 42 is less than the radius of the enlarged end of the flange portion 40, ribs 42 in the illustrated embodiment do not extend all the way to the enlarged end of the flange portion 40. The flange portion 40 in general can conform to any of several surfaces of rotation, including a frustoconical surface. The profile of flange 40 should vary smoothly between the inboard end of grip 28 and its junction with portion 38. By applying an axial inboard force against the nubs 50 on flange portion 40 with his or her hand, the rider is able to develop additional friction between the flange 40 and the hand. The nubbed flange 40 therefore allows the transmission of additional torque to the grip 28.

Figure 4:
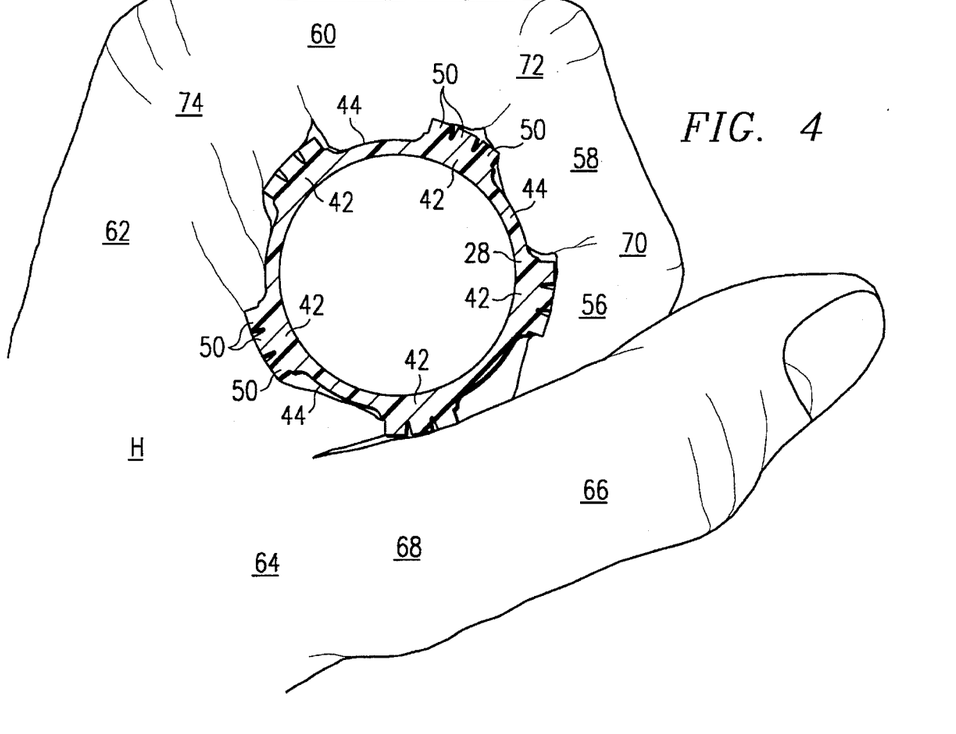
FIG. 4 is a part elevational, part sectional view of a cylindrical portion of the grip shown in FIG. 3 as being grasped by the left hand of a rider.

FIG. 4 illustrates the ergonomic arrangement which obtains when the hand of a rider engages the grip 28. As grasping the grip 28, the hand H forms several crooks and lands which may be taken advantage of by the grip of the invention. The rider is thereby able to exert an additional degree of torque; the advantage obtained may be compared with the advantage obtained by providing a wrench for a hexagonal nut. The bones of the forefinger of the hand H include a distal phalanx 56, a middle phalanx 58, a proximal phalanx 60 and a metacarpal 62. Similar bones (and the softer tissues surrounding them) of the middle and sometimes even the fourth finger (neither shown) will also grasp cylindrical section 38 of the grip. Engaging bones of the thumb include the metacarpal 64 and the proximal phalanx 66. A phalango-metacarpal joint 68 occurs between the proximal phalanx and the metacarpal of the thumb. In like manner, joints 70, 72 and 74 are formed, respectively, between the distal and the middle phalanges of the forefinger, the middle and proximal phalanges of the forefinger, and the proximal phalanx and the metacarpal of the forefinger.

The bone structure of the human hand, as bent in position around the grip 28, forms several natural crooks which correspond to each of the foregoing joints. In between these crooks are flats or lands which provide the gripping surface of the hand when grasping a cylindrical object. It has been discovered that providing five ribs 42 and preselecting a grip diameter to be of a certain size allows an approximate fit of each of the ribs 42 to a respective joint 70, 72, 74 or 68. The valley regions 44 in between the ribs 42 then form natural surfaces for the engagement of the lands or contact surfaces of the hand in between these crooks. This arrangement maximizes the amount of torque which a rider may apply to the shifter grip 28 before slipping occurs.

Figure 5A:
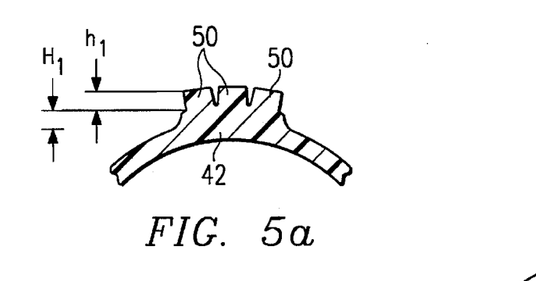
FIGS. 5a and 5b are details showing deformation of ribs and nubs upon application of torque.
Figure 5B:
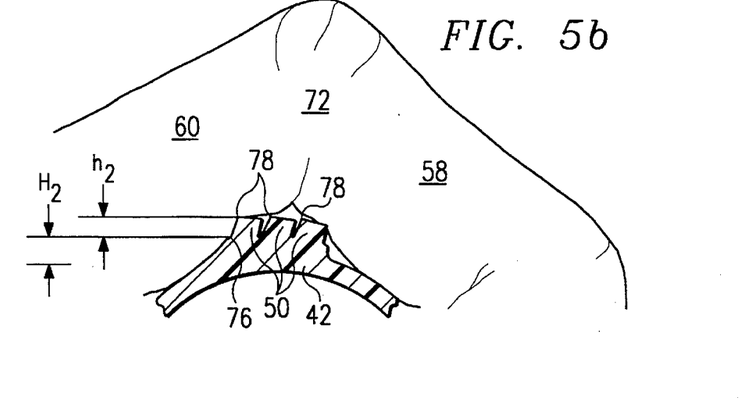

The provision of an elastomeric material to form the surface of the grip 28 also has the following torque-enhancing advantage best illustrated in the schematic detail shown in FIGS. 5a and 5b. FIG. 5a shows a rib 42 and nubs 50, in an unstressed condition during which the height of the ribs 42 will be $H_1$ and the height of the nubs 50 will be $h_1$. When the hand of the rider applies torque to the rib 42 and the nubs 50, both the rib 42 and the nubs 50 will begin to deform. As illustrated in FIG. 5b, a leading edge 76 of the rib 42 will begin to be raised, as will leading edges 78 of the hubs 50. This in turn will cause increases in the heights of the rib and hubs to $H_2$ and $h_2$ in comparison with the unstressed heights $H_1$ and $h_1$. The increased height will produce even greater torque since the torque is directly related to the radius at which the force is applied from the axis of rotation.

Figure 6:
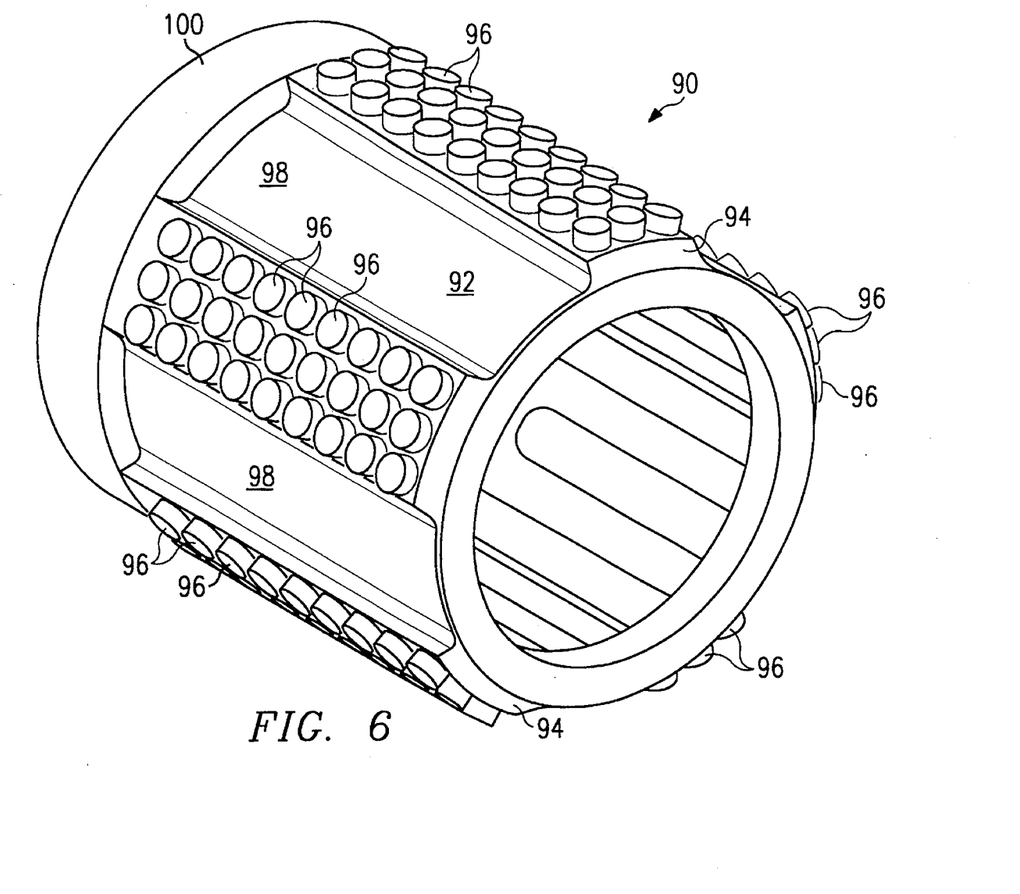
FIG. 6 is an isometric view of a second embodiment of a grip according to the invention.
Figure 7:
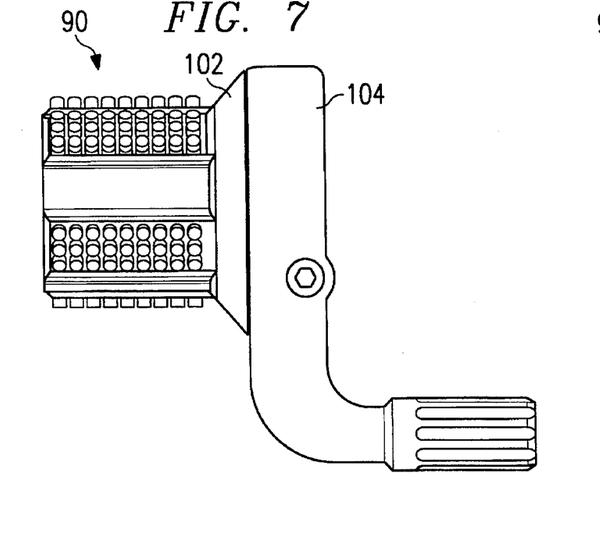
FIG. 7 is an elevational view of the grip shown in FIG. 6, as incorporated into a gear shifter assembly.
Figure 8:
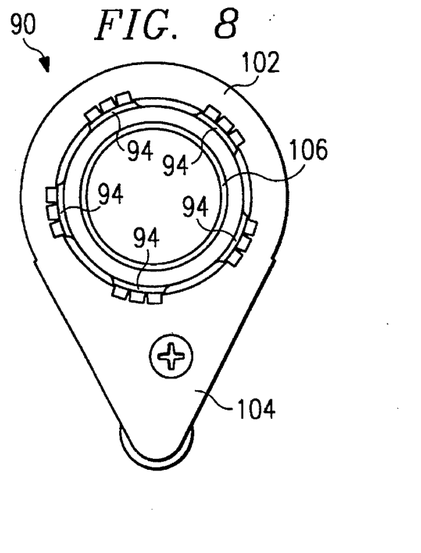
FIG. 8 is an end-on elevational view of the hand-rotatable gear shifter assembly shown in FIG. 7.

A second embodiment of a grip according to the invention is illustrated at 90 in FIGS. 6–8. In this embodiment, the gripping surface is generally cylindrical in shape (or slightly frustoconical) throughout its length. Upstanding frown the general cylindrical surface 92 are five ribs 94, each of which has on an outer surface thereof a matrix of upstanding elastomeric nubs 96. The ribs 94 are separated by valley regions 98, as before. The height of the ribs 94 with respect to the generally cylindrical surface 92 remains substantially constant throughout the length of the grip, although ribs 94 may taper slightly between the inboard and outboard ends. Ribs 94 and the generally cylindrical surface 92 terminate in a flange 100 which is received underneath a flange 102 of a housing 104 (FIG. 7). As before, the grip 90 is carried on a rotating member 106 (FIG. 8) which in turn rotates on a mandrel (not shown) that is fixed with respect to the bicycle handlebar.

Figure 9:
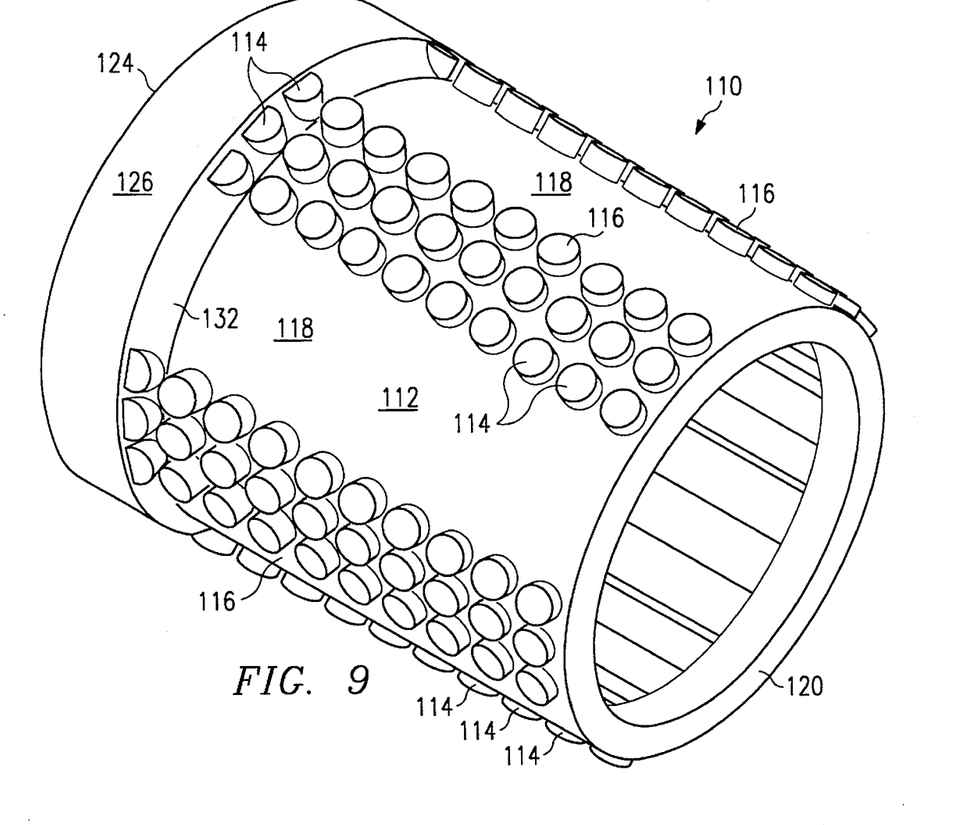
FIG. 9 is an isometric view of a third embodiment of a grip according to the invention.
Figure 10:
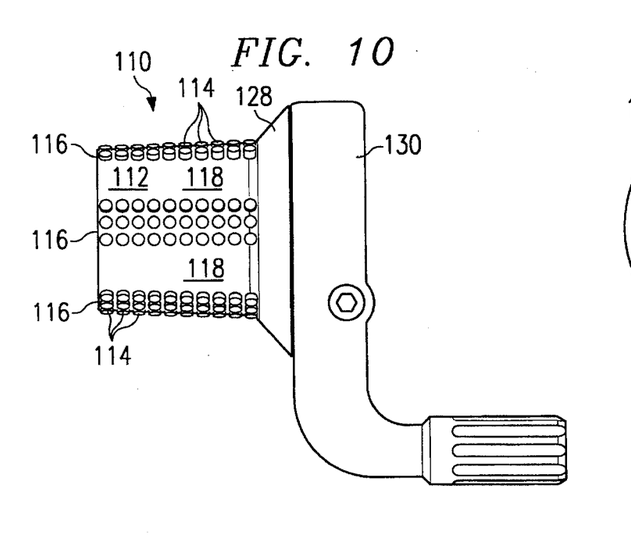
FIG. 10 is an elevational view of the grip shown in FIG. 9, as incorporated into a hand-rotatable gear shifter assembly.
Figure 11:
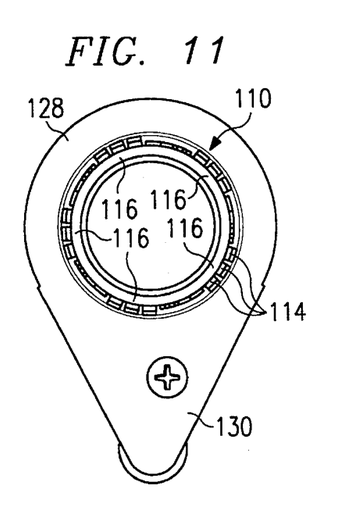
FIG. 11 is an end-on elevational view of the assembly shown in FIG. 10.

FIGS. 9–11 illustrate yet another embodiment of the invention. In this embodiment, a grip indicated generally at 110 has a generally cylindrical surface 112 (which may be slightly frustoconical or tapered) throughout its gripping length. A plurality of nubs 114 are arranged in five zones, matrices or groups 116 spaced equidistantly around the circumference of the grip 110. Unlike the prior embodiments, however, the nubs 114 are not mounted on ribs but instead are formed directly on the generally cylindrical surface 112. Five valley regions 118, on which no nubs 114 are formed, angularly space apart the nub groups 116.

On grip 110, the nubs 114 have a relatively small height near the outboard end 120 of the grip 110 and a relatively large height nearest the inboard end 124. The grip 110 terminates in an inboard flange 126 which (FIGS. 10 and 11) fits underneath a housing flange 128 of the gear shifter assembly 130. An intermediate frustoconical flange 132 joins the generally cylindrical surface 112 of the grip 110 with the inboard flange 126. A farthest-inboard file or circle of nubs 114 are formed on this intermediate flange 132 as well. In this way, the nubs 114 form a linear transition between the flange 126 and the cylindrical surface of the outboard handlebar grip 32 (see FIG. 1).

Figure 12:
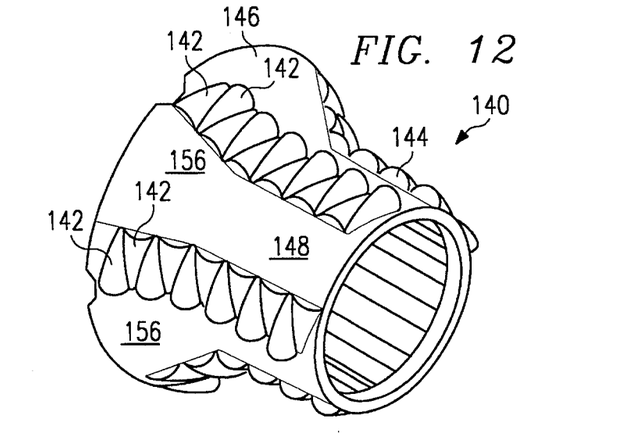
FIG. 12 is an isometric view of a third, "shark-tooth" embodiment of the invention.
Figure 13:
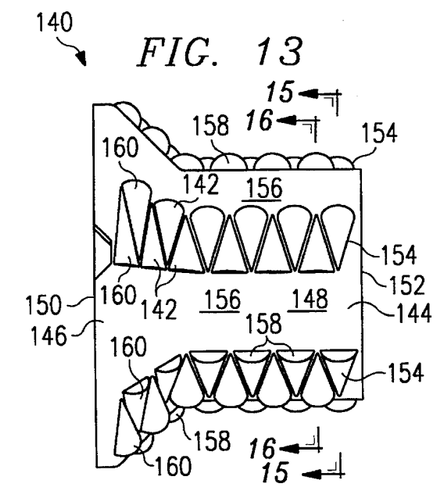
FIG. 13 is a side elevational view of the grip shown in FIG. 12.
Figure 14:
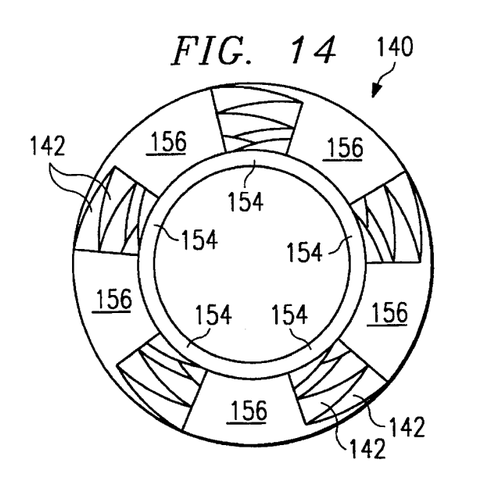
FIG. 14 is an end-on elevational view of the grip shown in FIG. 12.

FIGS. 12, 13 and 14 are isometric, elevational and end views of a grip indicated generally at 140 having a plurality of nubs or features 142 which are decidedly other than cylindrical in shape. The grip 140 takes the general shape of grip 28 (see FIGS. 1–3) in that it has a substantially cylindrical outboard portion 144 and a flanged inboard portion 146. The cylindrical portion 144 has a generally cylindrical surface 148 from which the triangularly-shaped nubs or "shark's teeth" radially outwardly extend. The flange 146 serves as a transition region between the generally cylindrical surface 148 and an inboard end 150 of the grip 140, which has a radius that is substantially larger than the outboard end 152 and which matches the radius of housing 26 (see FIG. 1). The transitional surface 146 may be any of several surfaces of rotation, but conveniently may be substantially frustoconical as shown.

As in the other embodiments, the nubs 142 are arranged in longitudinal groups or zones 154 which are formed both on the cylindrical portion 144 and the flanged portion 146 of the grip 140. The groups 154 are angularly spaced apart from each other by valley regions 156. There should be from four to six longitudinal groups 154. Where, as preferred, five longitudinal groups 154 are chosen as spaced by five valley regions 156, an ergonomic relationship to the rider's hand is obtained which is similar to that shown in FIG. 4. In the illustrated embodiment, each of the nub groups 154 is a one-dimensional array.

As seen from above (see FIG. 13), each of the nubs 142 is approximately triangular in shape. Each of the nubs 142 has a leading face 158 which is formed at a substantial angle to the general cylindrical surface 148 of the grip 140. Preferably, the leading face 158 is formed to be perpendicular to the general cylindrical surface 148. Each nub or shark tooth 142 also has a trailing surface or face 160 which gradually slopes from its juncture with a leading face 158 downward to the same radial elevation as the general cylindrical surface 148. In the illustrated embodiment, the trailing face 160 is curved both in a plane including the axis of rotation and in a plane perpendicular thereto, and the leading face 158 and the trailing surface or face 160 form the entire exterior surface of each nub 142. According to other designs which are within the scope of the invention, the trailing surface 160 may consist of several faces or surfaces.

Figure 15:
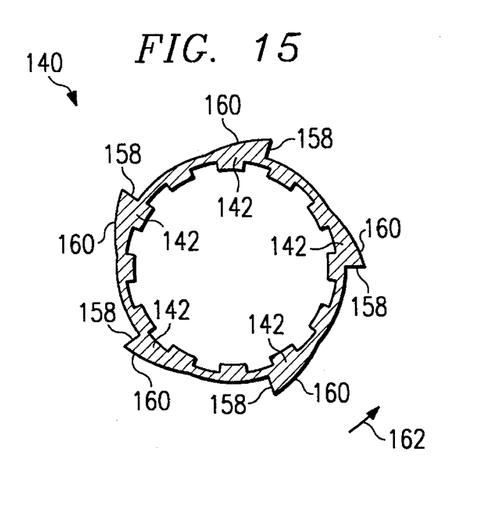
FIG. 15 is a radial sectional view taken substantially along line 15—15 of FIG. 13.

The triangular shape of each of the nubs 142 in the preferred embodiment allows a closest-packing arrangement in which a first set of the nubs 142 in each of the groups 154 have leading faces 158 which face a first direction, while an interleaved second set of the nubs 142 have leading faces 158 which face in a second direction opposite the first direction. This is best illustrated in the sectional views shown in FIGS. 15 and 16. In FIG. 15, a section has been taken through each of five nubs 142, which are members of respective groups 154. The leading faces 158 of the sectioned nubs 142 all face against a counterclockwise rotational direction, indicated by the arrow 162. When engaged by the hand of the rider, the various upstanding faces 158 will provide stops against which various skin surfaces of the hand will abut when the hand of the rider rotates the grip 140 in the counterclockwise direction 162. The trailing faces 160 and the material underneath them provide an enhanced resistance to circumferential deformation of the nub or shark tooth 142. The sectioned features 142 will therefore be able to transmit more torque to the grip 140 in general and from there to the underlying rotating member (not shown).

Figure 16:
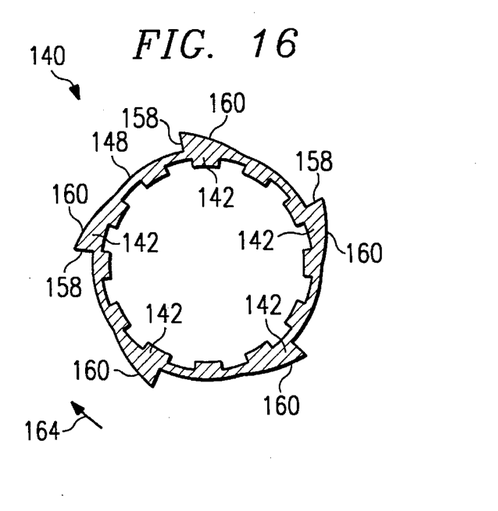
FIG. 16 is a radial sectional view taken substantially along line 16—16 of FIG. 13.

In FIG. 16 a radial section has been taken through an adjacent set of shark's teeth 142. These adjacent shark's teeth 142 have leading, upstanding faces 158 which face against a clockwise direction, which is indicated by arrow 164. When a rider's hand rotates the grip 140 in a clockwise direction, various surfaces of his or her hand will abut the leading faces 158 of these nubs 142, allowing for an effective transmission of torque to the grip 140 and ultimately to the underlying rotating member (not shown). Thus, a combination of shark's teeth having leading faces facing one direction, and shark's teeth having leading faces facing another direction, provide useful abutting surfaces against which a hand may apply torque regardless of the direction of rotation. The ramped nature of the "shark's teeth" 142 further assures that these features will not unduly deform but will instead straightforwardly transmit torque to the grip and to the underlying rotational member.

It is also possible to have a series of ramped features with leading edges that are not generally triangular in shape. For example, each of the zones or groups 154 could be populated with rectangular-shaped ramped features. Triangular-shaped shark's teeth 142 are preferred, however, because the largest amount of surface area of the leading faces 158 may be provided per unit of length of the grip 140.

While the embodiment shown in FIGS. 12–16 thus provides a plurality of abutting surfaces which advantageously transmit torque, the features 142 nonetheless allow mud, grit and other fouling matter to slide off into the regions in between the nubs 142, thus permitting a degree of retention of frictional force which is necessary to rotate the grip 140.

In summary, novel grips for hand-rotatable bicycle gear shifters have been disclosed and illustrated which provide nubbed surfaces for good retention of torque transmission under adverse environmental conditions, and which optimize the transmission of torque by being ergonomically fitted to a rider's hand. While preferred embodiments and their advantages have been described in the above detailed description, the invention is not limited thereto but only by the scope and spirit of the appended claims.

What is claimed is:

1. A hand-rotatable bicycle gear shifter, comprising:

a body having a first portion with a generally cylindrical exterior surface;

a plurality of longitudinally elongated ribs extending radially outwardly from said surface of said first portion, said ribs separated from each other by longitudinally elongated valley regions of said surface of said first portion, said valley regions being adaptable to fit respective flats of a rider's hand, said body being radially symmetrically formed around an axis, said valley regions having a surface at a first radius from said axis, said ribs having end surfaces formed at a second radius from said axis which is greater than said first radius; and a plurality of upstanding elastomeric nubs arranged in longitudinally elongated groups, said groups of nubs formed to extend radially outwardly from respective ones of said end surfaces, said valley regions not having any of said nubs.

2. A hand-rotatable bicycle gear shifter, comprising:

a body having a first portion with a generally cylindrical surface, said surface being radially symmetrical about an axis, said body having longitudinally opposed ends; said surface of said first portion having a first radius, said body including a second portion disposed between said first portion and one of said longitudinally opposed ends of said body, an exterior surface of said second portion having a second radius at said one of said longitudinally opposed ends which is substantially greater than said first radius;

a first plurality of upstanding elastomeric nubs extending radially outwardly from said surface of said first portion, said first plurality of nubs arranged in longitudinally elongated groups, said groups of nubs spaced from each other by longitudinally elongated valley regions of said first portion, said valley regions not having any of said nubs; and a second plurality of upstanding elastomeric nubs disposed on said exterior surface of said second portion.

3. The shifter of claim 2, and further comprising at least one ring of said second plurality of nubs that are circumferentially distributed on said exterior surface of said second portion of said body.

4. The shifter of claim 2, wherein said second portion of said body has valley regions on which there are no nubs.

5. The shifter of claim 2, wherein a profile of said second portion varies smoothly from said second radius to said first radius.

6. The shifter of claim 2, wherein said second portion is substantially frusto-conical in shape.

7. The shifter of claim 2, wherein said first portion has a plurality of longitudinally elongated ribs extending radially outwardly from said surface of said first portion, said ribs separated from each other by said valley regions, said ribs having end surfaces at a third radius from said axis which is greater than said first radius, said first plurality of nubs formed on said end surfaces of said ribs.

8. The shifter of claim 7, wherein said ribs do not extend in a longitudinal direction all of the way to said one of said longitudinally opposed ends.

9. The shifter of claim 7, wherein said third radius is less than said second radius.

10. A grip for a hand-rotatable bicycle gear shifter, comprising a rotating member, an exterior surface of said rotating member generally formed as a solid of rotation;

a plurality of axially elongated zones of said exterior surface angularly spaced from each other;

for each of said zones, a plurality of features radially upstanding from said exterior surface, each of said features having a leading face making a relatively sharp angle to said exterior surface and at least one trailing face bordering on said leading face and making a relatively small angle to said exterior surface; and at least first and second groups of said features, the leading faces of features in said first group of features facing a first direction of rotation, the leading faces of features in said second group of features facing a second direction of rotation, such that the hand of a rider will transmit torque to the rotating member through the first group of features when rotating the rotating member in said first direction, and such that the hand of the rider will transmit torque to the rotating member through the second group of features when rotating the rotating member in the second direction.

11. The grip of claim 10, wherein said features are elastomeric.

12. The grip of claim 10, wherein each of said zones includes features in said first group of features and features in said second group of features.

13. The grip of claim 10, wherein features in said first group of features are interleaved with features in said second group of features.

14. The grip of claim 10, wherein said features are triangular in shape.

15. The grip of claim 10, wherein each said trailing face is curved in a plane perpendicular to the axis of rotation.

16. The grip of claim 10, wherein each said trailing face is curved in a plane which includes the axis of rotation.

17. The grip of claim 10, wherein each of said zone has a one-dimensional array of features in said first group alternating with features in said second group, said array being axially elongated.

* * * * *